(12) United States Patent
Asada

(10) Patent No.: US 8,885,203 B2
(45) Date of Patent: Nov. 11, 2014

(54) OPTICAL READING DEVICE AND CONTROL METHOD FOR AN OPTICAL READING DEVICE

(75) Inventor: Kenji Asada, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 323 days.

(21) Appl. No.: 13/416,490

(22) Filed: Mar. 9, 2012

(65) Prior Publication Data

US 2012/0229869 A1 Sep. 13, 2012

(30) Foreign Application Priority Data

Mar. 9, 2011 (JP) ................................. 2011-051964

(51) Int. Cl.
*G06K 15/00* (2006.01)
*H04N 1/04* (2006.01)
*H04N 1/00* (2006.01)
*H04N 1/203* (2006.01)
*H04N 1/32* (2006.01)

(52) U.S. Cl.
CPC .... *H04N 1/00798* (2013.01); *H04N 2201/0081* (2013.01); *H04N 1/0461* (2013.01); *H04N 1/2032* (2013.01); *H04N 2201/3294* (2013.01); *H04N 1/0464* (2013.01); *H04N 1/00204* (2013.01); *H04N 1/32363* (2013.01); *H04N 2201/0039* (2013.01)
USPC ..................... 358/1.16; 358/1.17; 358/426.05; 358/426.1; 710/56; 710/20; 711/209; 711/169; 711/173

(58) Field of Classification Search
CPC ............. G06K 15/1817; H04N 1/2195; G11B 2020/10666
USPC ............ 358/1.16, 1.17, 426.05, 426.1; 711/4, 711/110, 169, 173, 218, 202, 209; 710/52, 710/56, 3, 20
See application file for complete search history.

(56) References Cited

U.S. PATENT DOCUMENTS

| 6,456,399 | B1 | 9/2002 | Ho et al. |
| 2003/0193691 | A1 * | 10/2003 | Tanaka et al. ................ 358/1.16 |
| 2008/0036801 | A1 * | 2/2008 | Mihara .............................. 347/5 |
| 2008/0112012 | A1 * | 5/2008 | Yokoyama et al. .......... 358/3.03 |
| 2009/0222616 | A1 | 9/2009 | Yano et al. |
| 2009/0231638 | A1 * | 9/2009 | Umezawa ..................... 358/474 |

FOREIGN PATENT DOCUMENTS

| JP | 2003-303168 A | 10/2003 |
| JP | 2004-094735 A | 3/2004 |
| JP | 2005-218140 A | 8/2005 |
| JP | 2008-135133 A | 6/2008 |
| JP | 2008-146225 A | 6/2008 |
| JP | 2009-211235 A | 9/2009 |

* cited by examiner

*Primary Examiner* — Jamares Q Washington
(74) *Attorney, Agent, or Firm* — Nutter McClennen & Fish LLP; John J. Penny, Jr.; Joshua I. Rudawitz

(57) ABSTRACT

An optical reading device has an optical reading unit having optical elements disposed in a line that reads a medium; a storage unit having a ring buffer formed in the storage space; and a control unit that writes scanned data read by the optical reading unit to the ring buffer, reads the scanned data written to the ring buffer, and transfers the scanned data that was read. The control unit also manages positions in the ring buffer for writing and reading the scanned data using a write pointer denoting the position for writing the scanned data to the ring buffer, and a read pointer denoting the position of scanned data that has not been read.

8 Claims, 10 Drawing Sheets

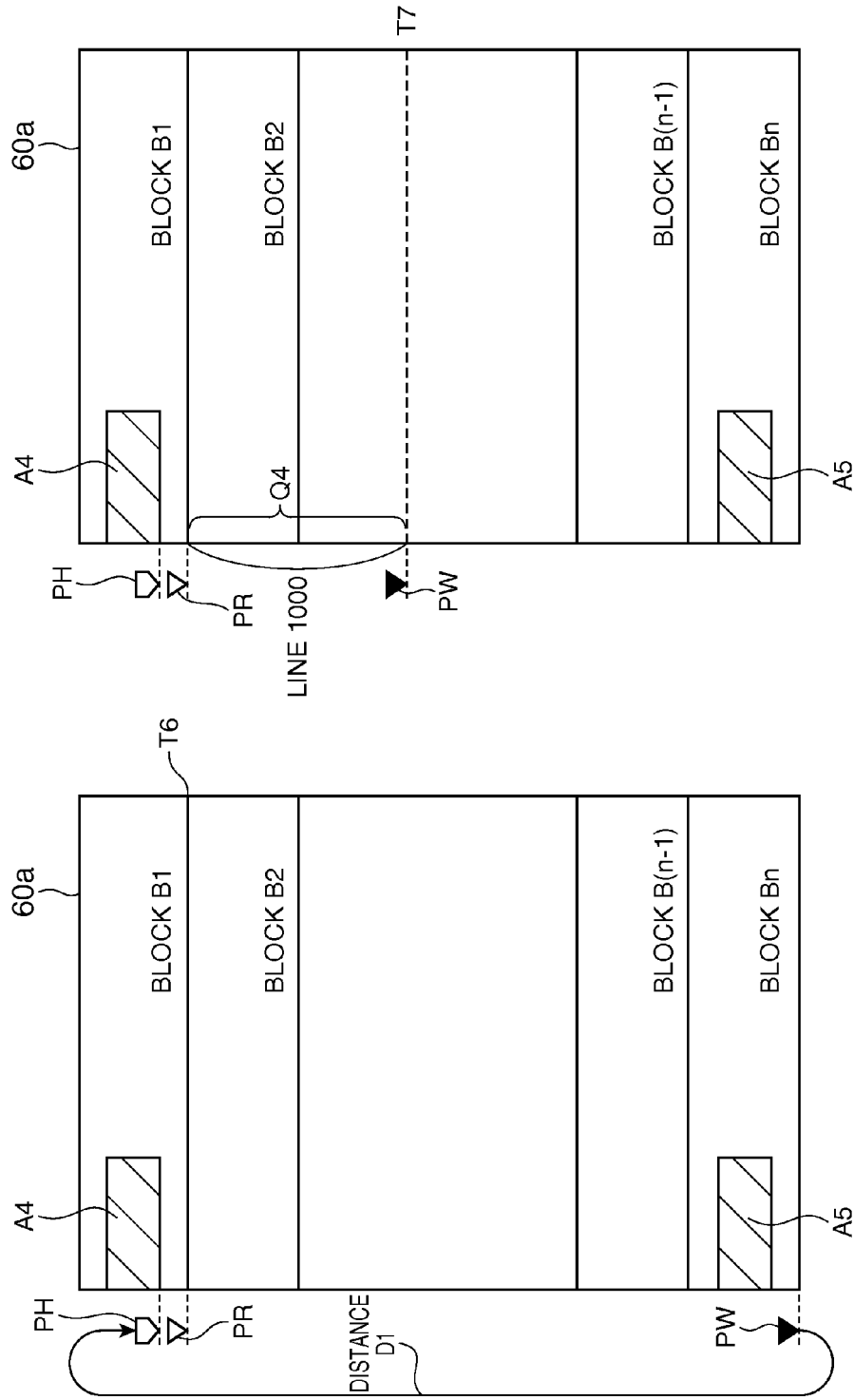

OPTICAL READING DEVICE AND CONTROL METHOD FOR AN OPTICAL READING DEVICE

BACKGROUND

1. Technical Field

The present invention relates to an optical reading device that optically reads media to be scanned, and to a method of controlling the optical reading device.

2. Related Art

Optical reading devices that optically scan a medium to be read and write the scanned data sequentially to a ring buffer are known from the literature. See, for example, Japanese Unexamined Patent Appl. Pub. JP-A-2004-94735.

Data written to a ring buffer in such optical reading devices is generally read sequentially.

However, in devices such as the above optical reading device that write the scanning results to a ring buffer and read sequentially, writing can be controlled to prevent writing new data to the area where the data to be read is written, but there is a need to assure as much writable space as possible in the ring buffer in order to prevent such problems as overflow errors.

SUMMARY

The invention is directed to the foregoing problem, and an object of the invention is to ensure that the space that can be written in the ring buffer is as large as possible.

A first aspect of the invention is an optical reading device including: an optical reading unit having optical elements disposed in a line that reads a medium; a storage unit having a ring buffer formed in the storage space; and a control unit that writes scanned data read by the optical reading unit to the ring buffer, reads the scanned data written to the ring buffer, transfers the scanned data that was read, and manages positions in the ring buffer for writing and reading the scanned data using a write pointer denoting the position for writing the scanned data to the ring buffer, and a read pointer denoting the position of scanned data that has not been read.

Preferably, the optical reading device also has a configuration unit that defines a specific area on the medium; and the control unit reads scanned data in a defined area defined by the configuration unit, and when the scanned data between the position of the read pointer and the position of the write pointer in the ring buffer writing direction is not the scanned data from the defined area, executes a dummy reading process that advances the position of the read pointer without reading the scanned data.

This aspect of the invention applies a dummy reading process that advances the position of the read pointer without reading the scanned data written to the intervening lines to lines that are between the write pointer and the read pointer and contain scanned data that does not require reading. As a result, the position of the read pointer moves appropriately and more areas in the ring buffer that have been completely read, that is, areas to which new scanned data can be written, can be assured.

In an optical reading device according to another aspect of the invention, the scanned data that the control unit writes to the ring buffer is line data; and reading the scanned data is performed in blocks each containing a plurality of line data.

This aspect of the invention applies a dummy reading process that advances the position of the read pointer without reading the scanned data written to the intervening lines to lines that are between the write pointer and the read pointer and contain scanned data that does not require reading. As a result, the position of the read pointer can be advanced before writing scanned data to all lines in one block is completed, and more areas in the ring buffer that have been completely read, that is, areas to which new scanned data can be written, can be assured.

In an optical reading device according to another aspect of the invention, after writing the line data to one block is completed, the control unit moves the read pointer to the position of line data to be read from the one block, and reads the line data in the one block while moving the position of the read pointer in the one block.

This aspect of the invention applies a dummy reading process when there is no data that requires reading on lines located between one block associated with one area and another block associated with another area. As a result, the position of the read pointer can be advanced before writing scanned data to all lines in the block associated with the other area is completed, and more areas in the ring buffer that have been completely read, that is, areas to which new scanned data can be written, can be assured.

In an optical reading device according to another aspect of the invention, the configuration unit can set a first area and a second area that is different from the first area; and when the configuration unit sets the first area and the second area, the control unit reads the second area after reading the first area.

In an optical reading device according to another aspect of the invention, when the position of the write pointer and the position of the read pointer are separated a predetermined amount or more, the control unit determines if there is scanned data to be read between the position of the read pointer and the position of the write pointer in the write direction of the control unit, and when there is no scanned data to read, executes a dummy reading process that advances the position of the read pointer.

This aspect of the invention applies a dummy reading process to the lines between the pointers when the position of the write pointer and the position of the read pointer are separated a predetermined amount or more and the scanned data written to the lines between these pointers is data that does not require reading, and a dummy reading process can therefore be appropriately executed as needed.

In an optical reading device according to another aspect of the invention, the control unit uses a destructive pointer denoting the position in the ring buffer of scanned data that can be deleted or overwritten and, so that the destructive pointer does not surpass the position of the write pointer, controls the write pointer and controls the destructive pointer so that the destructive pointer does not surpass the position of scanned data that has not been completely read regardless of the position of the read pointer.

This aspect of the invention advances the position of the destructive pointer that tracks the read pointer while the position of the read pointer is advanced by the dummy reading process, and as a result can assure more areas to which new scanned data can be written.

Another aspect of the invention is a method of controlling an optical reading device, including steps of; reading a medium by an optical reading unit having optical elements disposed in a line; writing scanned data that was read to a ring buffer and moving a write pointer denoting the position where the scanned data was written; reading the scanned data written to the ring buffer; and when the scanned data has been read, moving a read pointer denoting the position where the scanned data was read to the position where the scanned data was read.

Further preferably, this method of controlling an optical reading device also includes a step of setting a specific area on the medium; and when the scanned data written between the position of the read pointer and the position of the write pointer in the ring buffer writing direction is not scanned data from the defined area, moves the read pointer without reading the scanned data.

The control method according to this aspect of the invention applies a dummy reading process that advances the position of the read pointer without reading the scanned data written to the intervening lines to lines that are between the write pointer and the read pointer and contain scanned data that does not require reading. As a result, the position of the read pointer moves appropriately and more areas in the ring buffer that have been completely read, that is, areas to which new scanned data can be written, can be assured.

In another aspect of the invention, the scanned data written to the ring buffer is line data; and reading the scanned data from the ring buffer is performed in block units each containing a plurality of line data units.

In another aspect of the invention, the scanned data read from the ring buffer batch transfers the scanned data contained in the defined area to a host device.

The invention can thus assure more space to which data can be written in a ring buffer.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 10 describes the image buffer during an area scan.

DESCRIPTION OF EMBODIMENTS

A preferred embodiment of the present invention is described below with reference to the accompanying figures.

Figure 1:
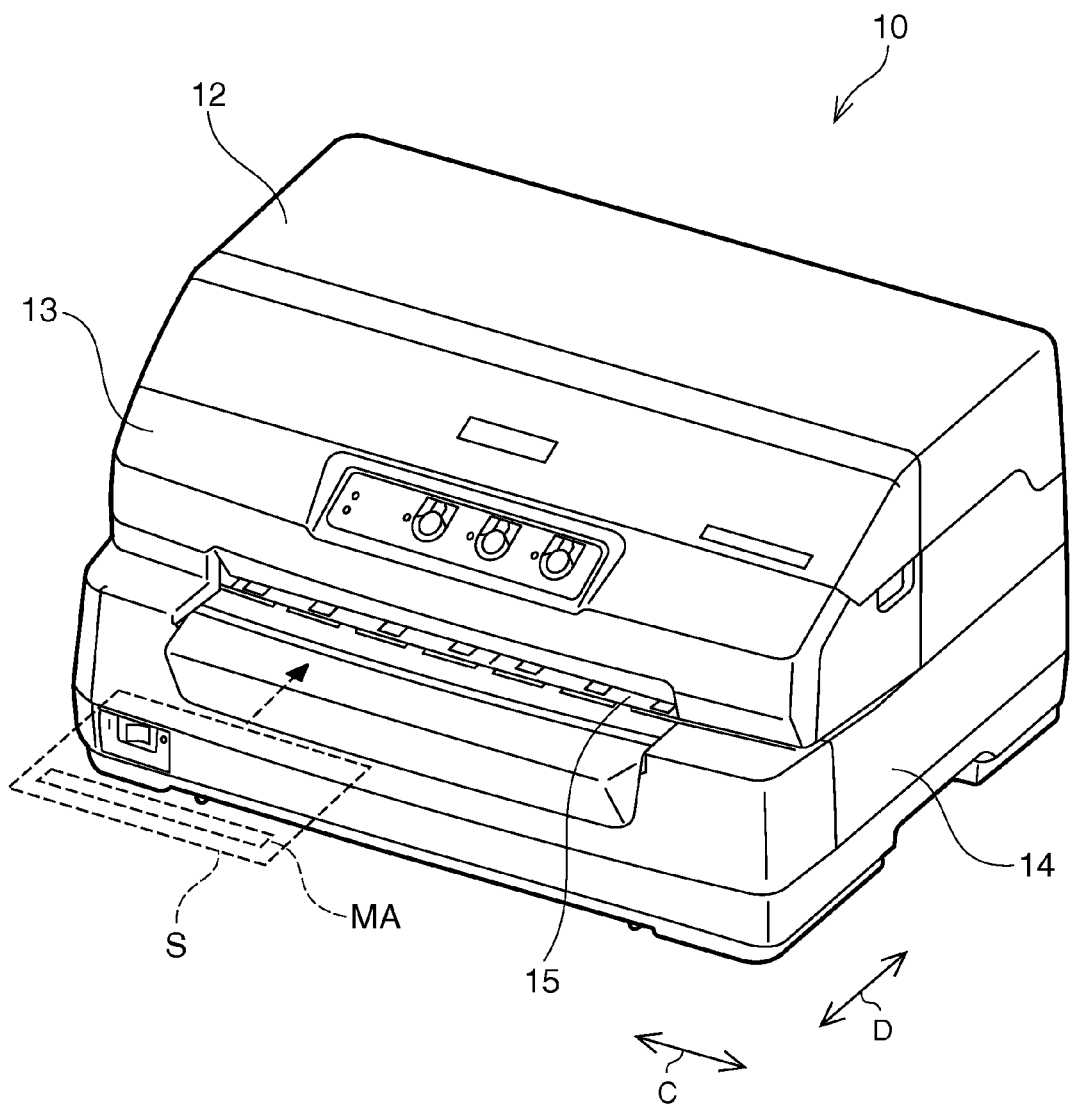
FIG. 1 is an external oblique view of a dot impact printer according to a preferred embodiment of the invention.
Figure 2:
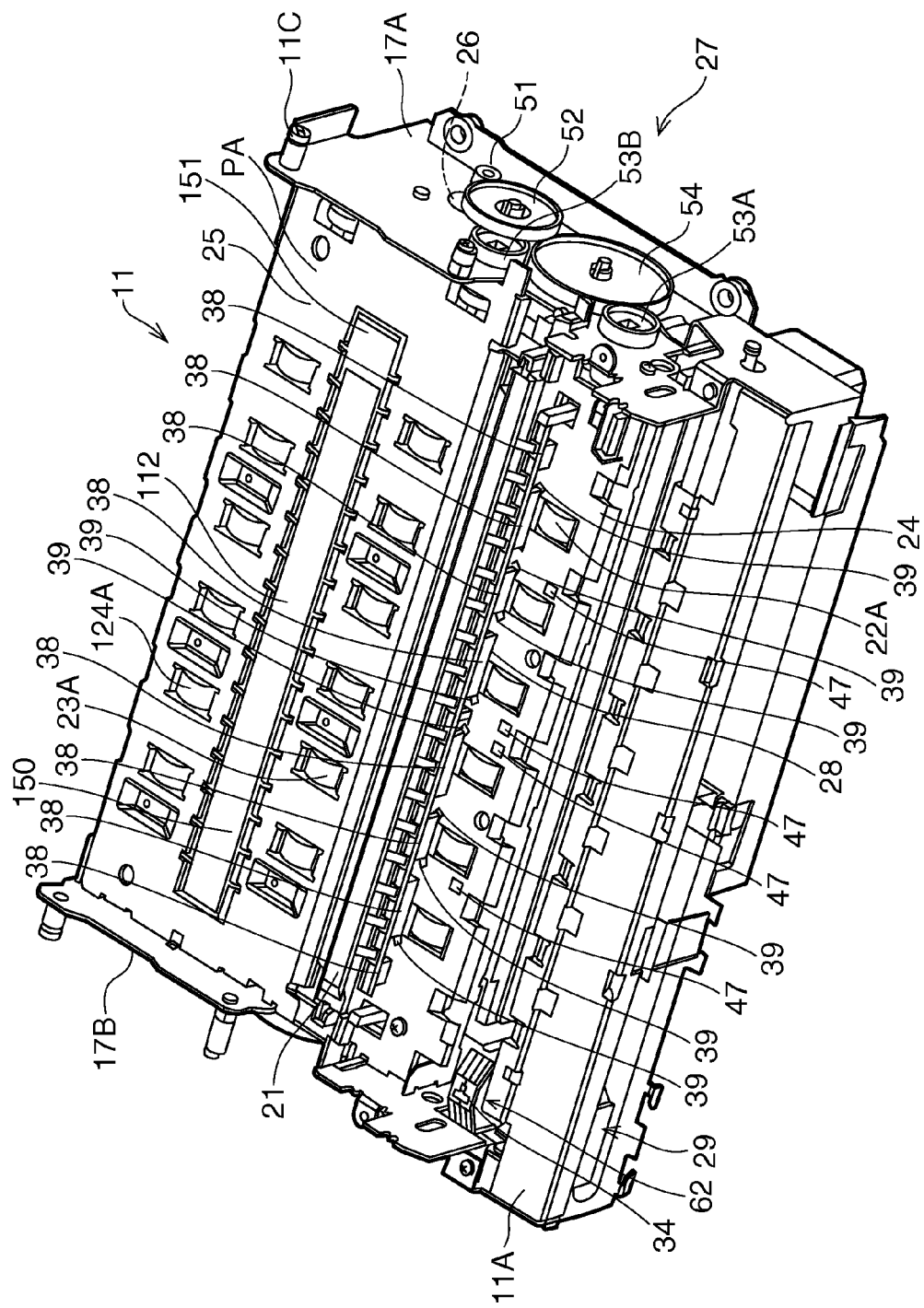
FIG. 2 is an oblique view of the print assembly.
Figure 3:
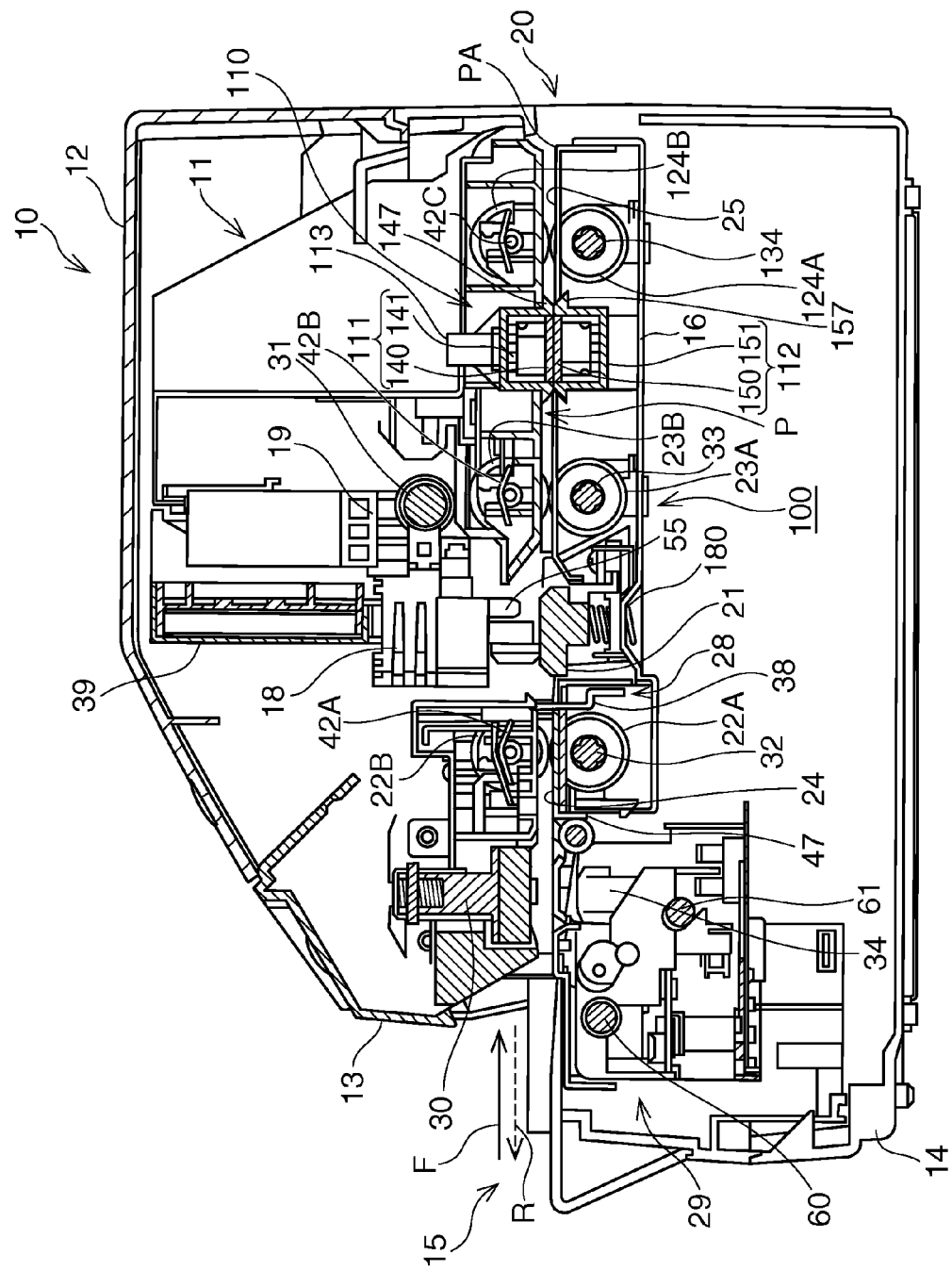
FIG. 3 is a side section view of the print assembly.

FIG. 1 is a front oblique view showing the appearance of a dot impact printer 10 (optical reading device) according to a preferred embodiment of the invention. FIG. 2 is an oblique view of the print assembly 11. FIG. 3 is a side section view of the dot impact printer 10 in FIG. 1.

The dot impact printer 10 shown in FIG. 1 records images, including text, by driving plural recording wires of a recording head 18 (see FIG. 3) against a recording medium S with an ink ribbon (not shown in the figure) delivered from a ribbon cartridge (not shown in the figure) therebetween in order to form dots on the recording surface of the recording medium S. The dot impact printer 10 has an optical reader (scanner) 110 (FIG. 3) and also functions as an optical reading device that can optically read text, symbols, images, and other content on the surface of the recording medium S.

Cut-sheet media that is precut to a certain length, and continuous media having numerous sheets connected in a continuous web, are examples of recording media S (media) that can be used in the dot impact printer 10. Cut-sheet media include, for example, single slips and multipart forms, passbooks, postcards, and letters. Continuous media include continuous multipart form paper and perforated fanfold paper. In this embodiment of the invention checks and promissory notes (collectively referred to herein as simply checks) issued on a bank account, for example, and passbooks issued by a bank or other financial institution, are used as the recording medium S.

Checks are slips on which MICR (magnetic ink character recognition) information containing the user's account number and a serial check number, for example, are printed in a MICR area MA on the front of the check. A passbook is a bound booklet of plural blank pages that can be printed on when the passbook is open. A magnetic stripe is typically rendered on the outside surface of one of the passbook covers.

As shown in FIG. 1, the dot impact printer 10 has a top cover 12, a top case 13, and a bottom case 14 as outside case members, and a manual insertion opening 15 in the front of the top case 13 and bottom case 14 where the recording medium S is inserted and discharged. A paper exit 20 from which the recording medium S may be discharged is also formed at the back of the top case 13 and bottom case 14. Whether the recording medium S processed by the dot impact printer 10 is discharged from the manual insertion opening 15 or the paper exit 20 is controlled by a command sent to the dot impact printer 10 from the host computer 200 described below.

The side where the manual insertion opening 15 is rendered, that is, the left side as seen in FIG. 3, is referred to herein as the front, and the side where the paper exit 20 is rendered, that is, the right side in FIG. 3, is referred as the rear or back.

As shown in FIG. 2, the dot impact printer 10 has a print assembly 11 that is covered by the foregoing case members. The print assembly 11 includes a bottom chassis part 11A and a top chassis part (not shown in the figure) that is supported by pins 11C at the back of the bottom chassis part 11A. The top chassis part can pivot by operating a lever (not shown in the figure) disposed on the left side of the top chassis part, and the inside of the print assembly 11 is exposed when the top chassis part pivots open.

As shown in FIG. 2 and FIG. 3, the print assembly 11 includes a base frame 16 and a right side frame 17A and left side frame 17B pair attached to the sides of the base frame 16. The side frames (not shown in the figure) of the top case chassis part are disposed on the outside of the side frames 17A and 17B with a carriage guide shaft 31 spanning therebetween and a flat front media guide 24 and rear media guide 25 affixed between the side frames 17A and 17B. A flat platen 21 is disposed between the front media guide 24 and rear media guide 25, and the recording head 18 is disposed above the platen 21 facing the platen 21.

The recording head 18 is mounted on a carriage 19 that is fit freely slidably on the carriage guide shaft 31. The carriage 19 is driven through an intervening timing belt (not shown in the figure) by the forward or reverse rotation of a carriage drive motor 56 (FIG. 4) that drives the carriage 19, and the carriage 19 thus moves reciprocally guided by the carriage guide shaft 31. The carriage 19 scans bidirectionally between the side frames of the top chassis part in the direction indicated by arrow C in FIG. 1, that is, in the main scanning direction aligned with the axial direction of the carriage guide shaft 31 and the long side of the platen 21. Note that the direction perpendicular to the main scanning direction C of the carriage 19, that is, the direction indicated by arrow D in FIG. 1, is the secondary scanning direction.

While the recording head 18 carried on the carriage 19 travels in the main scanning direction with the carriage 19, recording wires are pushed out from the wire face (not shown in the figure) on the distal end of the recording head 18 opposite the platen 21 to strike the ink ribbon and transfer ink from the ink ribbon to the recording medium S conveyed between the platen 21 and the recording head 18, and record an image, which may include text, on the recording medium S. The ink ribbon is stored folded inside a ribbon cartridge (not shown in the figure) that is mounted on the main frame or the carriage 19, and is delivered to the recording head 18 while the carriage 19 scans the recording medium. As shown in FIG. 3, a media width sensor 55 is disposed behind the recording head 18 at a position above the platen 21. The media width sensor 55 is mounted on the carriage 19 and travels with the carriage 19 over the platen 21, and is used to determine the positions of the side edges of the recording medium S and the width of the recording medium S.

As shown in FIG. 2 and FIG. 3, the platen 21 is flat and extends in the scanning direction of the carriage 19, and is flexibly supported and urged toward the recording head 18 by an urging spring 180. The urging spring 180 is a compression spring, and the striking force of the recording wires during the recording operation of the recording head 18 is assisted by the urging force of the urging spring 180. When the thickness of the recording medium S varies while the recording medium S is conveyed, or when recording media S of different thicknesses are conveyed to the print assembly 11, the platen 21 is pushed by the distal end of the recording head 18 in resistance to the urging force of the urging spring 180 and moves away from the recording head 18. As a result, the gap between the distal end of the recording head 18 and the recording surface of the recording medium S is held constant regardless of the thickness of the recording medium S.

As shown in FIG. 3, the printer assembly 11 includes a media conveyance mechanism (conveyance unit) 100 that conveys the recording medium S, an alignment mechanism 28 that contacts the leading end of the recording medium S conveyed by the media transportation mechanism 100 and aligns the recording medium S, a magnetic data reading unit 29 having a magnetic head 34 that reads the MICR information printed on a check or reads or writes magnetic information in the magnetic stripe on a passbook, and a media pressure unit 30 that pushes down on the recording medium S to prevent the recording medium S from lifting up during magnetic information processing, including when the magnetic head 34 of the magnetic data reading unit 29 reads the MICR information.

As shown in FIG. 2 and FIG. 3, the media transportation mechanism 100 includes the platen 21, a first drive roller 22A, a first follower roller 22B, a second drive roller 23A, a second follower roller 23B, a third drive roller 124A, a third follower roller 124B, the front media guide 24, the rear media guide 25, a media conveyance motor 26, and a drive wheel train 27. The media transportation mechanism 100 renders a transportation path P through which the recording medium S is conveyed over the front media guide 24 and rear media guide 25. The tops of the front media guide 24 and rear media guide 25 are conveyance surface PA of the transportation path P.

In this embodiment of the invention the first drive roller 22A and first follower roller 22B are disposed on the front side of the printer assembly 11 relative to the platen 21 and recording head 18, and the second drive roller 23A and second follower roller 23B pair, and third drive roller 124A and third follower roller 124B pair, are disposed sequentially on the rear side of the printer assembly 11 relative to the platen 21 and recording head 18.

The first drive roller 22A and first follower roller 22B are disposed as a roller pair one above the other, the second drive roller 23A and second follower roller 23B are disposed as a roller pair one above the other, and the third drive roller 124A and third follower roller 124B are disposed as a roller pair one above the other.

The first drive roller 22A, second drive roller 23A, and third drive roller 124A are drive rollers that are driven rotationally by the media conveyance motor 26 and drive wheel train 27. The first follower roller 22B, second follower roller 23B, and third follower roller 124B are follower rollers that are urged by springs 42A, 42B, and 42C with specific pressure to the first drive roller 22A, second drive roller 23A, and third drive roller 124A side, respectively. As a result, the first drive roller 22A and first follower roller 22B are rotationally driven in mutually opposite directions, the second drive roller 23A and second follower roller 23B are rotationally driven in mutually opposite directions, and the third drive roller 124A and third follower roller 124B are rotationally driven in mutually opposite directions.

The drive wheel train 27 is disposed on the outside of the right side frame 17A as shown in FIG. 2. The drive wheel train 27 has a motor pinion 51 that is affixed to rotate in unison with the drive shaft of the media conveyance motor 26, which can rotate in forward and reverse directions. Drive power from the motor pinion 51 is transferred through a speed reducing gear 52 to a second drive gear 53B affixed to the second roller shaft 33 of the second drive roller 23A, and is transferred from this second drive gear 53B through an intermediate gear 54 to a first drive gear 53A affixed to the first roller shaft 32 of the first drive roller 22A.

Torque from the second roller shaft 33 of the second drive roller 23A is transferred to the third roller shaft 134 of the third drive roller 124A by a drive belt (not shown in the figure), for example. As a result, the first drive roller 22A, second drive roller 23A, and third drive roller 124A shown in FIG. 3 rotate in the same direction and can convey the recording medium S in the printer assembly 11. More specifically, when the media conveyance motor 26 rotates forward, the first drive roller 22A, second drive roller 23A, and third drive roller 124A shown in FIG. 3 convey the recording medium S in the secondary scanning direction inside the printer assembly 11 as denoted by arrow F in the figure, and convey the recording medium S in the direction in which it is discharged from the printer assembly 11 as indicated by arrow R in the figure when the media conveyance motor 26 turns in reverse.

The alignment mechanism 28 aligns the recording medium S before the recording head 18 prints on the recording medium S and before the optical reader 110 scans the recording medium S. The alignment mechanism 28 includes plural alignment plates 38 and an alignment plate motor (see FIG. 4) that drives the alignment plates 38. The alignment plates 38 are arrayed in the main scanning direction between the first drive roller 22A and first follower roller 22B and the recording head 18 and platen 21, and can protrude into the transportation path P. The alignment mechanism 28 aligns the orientation of the recording medium S by causing the leading end of the recording medium S to contact the alignment plates 38.

As shown in FIG. 2, the printer assembly 11 has a plurality of alignment sensors 39 that detect the presence of the recording medium S driven in contact with the alignment plates 38. The alignment sensors 39 are disposed to the transportation path P arrayed in the main scanning direction near the upstream side of the alignment plates 38, and are transmissive sensors including a light-emitting unit (such as an LED) and a photodetection unit (such as a phototransistor) disposed with the transportation path P therebetween. Whether the skew of the recording medium S to the transportation direction after alignment by the alignment mechanism 28 is within the allowable range can be determined from the number and positions of the plural alignment sensors 39 that detect the leading end of the recording medium S.

The dot impact printer 10 has a control circuit board (not shown in the figure) located behind and below the print assembly 11, for example, as a control unit that controls dot impact printer IO operations, including driving the media conveyance motor 26, carriage 19 scanning, the recording operation of the recording wires of the recording head 18, and the reading (scanning) operation of the optical reader 110.

The printer assembly 11 also has a plurality of media edge sensors 47 that detect insertion of a recording medium S to the transportation path P in front of the first drive roller 22A. The media edge sensors 47 are reflective sensors having a light-emitting unit that emits light toward the transportation path P and a photodetection unit that detects the reflection of the emitted light, and detect the recording medium S inserted from the manual insertion opening 15. Note that the media edge sensors 47 may alternatively be transmissive sensors having a light-emitting unit and a photodetection unit disposed with the transportation path P therebetween. This configuration determines that a recording medium S was inserted to the transportation path P when the photodetection units of all insertion detection sensors 47 sense light and then detection of light by any one of the insertion detection sensors 47 is blocked.

As shown in FIG. 3, the print assembly 11 has an optical reader 110 (optical reading unit) that reads text, symbols and images presented on the surface of the recording medium S. The optical reader 110 includes a first scanner 111 (reading unit) that reads information printed or otherwise presented on the top surface of the recording medium S, and a second scanner 112 (reading unit) disposed opposite the first scanner 111 that similarly reads information printed or otherwise presented on the bottom surface of the recording medium S. The recording medium S is normally inserted from the manual insertion opening 15 so that the side on which the MICR information is printed is on the bottom.

The first scanner 111 and second scanner 112 are optical image sensors that are disposed between the second drive roller 23A and third drive roller 124A and continuously read information from the recording medium S conveyed through the transportation path P.

The first scanner 111 and second scanner 112 may be contact image sensors (CIS), for example, and respectively have a flat glass plate 140, 150 that contacts the recording medium S, and a support frame 141, 151 that supports the glass plate 140, 150. An emitter (not shown in the figure) that illuminates the reading area of the recording medium S with light output from an LED or other light source, a plurality of photodetection sensors (not shown in the figure) arrayed in a single row in the main scanning direction (C axis), and an output unit (not shown in the figure) that outputs the signals from the photodetection sensors to the control circuit unit described above, are housed inside the support frames 141, 151. The first scanner 111 and second scanner 112 are not limited to CIS scanners, however, and CCD (charge coupled device) scanners may be used instead.

As shown in FIG. 2, the second scanner 112 has a support frame 151 and glass plate 150 extending lengthwise across the width of the dot impact printer 10 parallel to the platen 21. The support frame 151 is disposed so that the top surface of the glass plate 150 is exposed to the transportation path P through a window formed in the rear media guide 25. The first scanner 111 is disposed above the second scanner 112 as shown in FIG. 3 so that the bottom surface of the glass plate 140 is opposite the top of glass plate 150, and likewise extends in the main scanning direction with substantially the same length as the second scanner 112.

An urging member 113 is disposed above the first scanner 111, and the first scanner 111 is urged toward the recording medium S on the rear media guide 25 by the urging member 113. The urging member 113 pushes the first scanner 111 to the second scanner 112 with substantially uniform pressure across the width. A coil spring, flat spring, or elastomer cushion, for example, can be used as the urging member 113. A gap that accommodates recording media of a specific thickness is rendered between the surfaces of the glass plates 140, 150. When scanning a recording medium S, the first scanner 111 is pushed up by the conveyed recording medium S and the urging member 113 contracts, allowing the recording medium S to pass between the glass plates 140, 150. More specifically, the scanning quality of the optical reader 110 is improved by the first scanner 111 that is urged by the urging member 113 pushing the recording medium S to the second scanner 112 side so that the recording medium S reliably contacts the surfaces of the glass plates 140, 150.

The photosensors (not shown in the figure) of the first scanner 111 and second scanner 112 are arrayed in a row in the main scanning direction of the dot impact printer 10, and scan lines extending in the main scanning direction. More specifically, the first scanner 111 and second scanner 112 rendering an optical reading unit have optical elements arrayed in a line. The photosensors of the first scanner 111 and second scanner 112 are disposed across a wider range in the main scanning direction than the printing range of the recording head 18, and can scan a wider range than any recording medium that can be printed on by the dot impact printer 10. The optical reader 110 can therefore read the entire surface of any recording medium S that can be used in the dot impact printer 10.

The first scanner 111 and second scanner 112 are disposed on opposite sides of the transportation path P as shown in FIG. 3, but the line of photosensors in the first scanner 111 and the line of photosensors in the second scanner 112 are offset approximately 5 mm from each other in the transportation direction of the recording medium S. This configuration eliminates the effect of light from one light source on the other photosensor unit and results in higher scanning quality.

The first scanner 111 and second scanner 112 each have R, G, and B light sources, and can scan in both monochrome (binary, 16 level, 256 level gray scale) and color modes. The scanning resolution of the first scanner 111 and second scanner 112 can be set to one of three levels, 200 dpi (dots/inch), 300 dpi, and 600 dpi. The number of scan lines in the transportation direction of the recording medium S (the secondary scanning direction) is set according to the scanning resolution in the main scanning direction, and the conveyance speed of the recording medium S during scanning is adjusted according such parameters as the scanning resolution and how fast the photosensor output signals can be processed.

Figure 4:
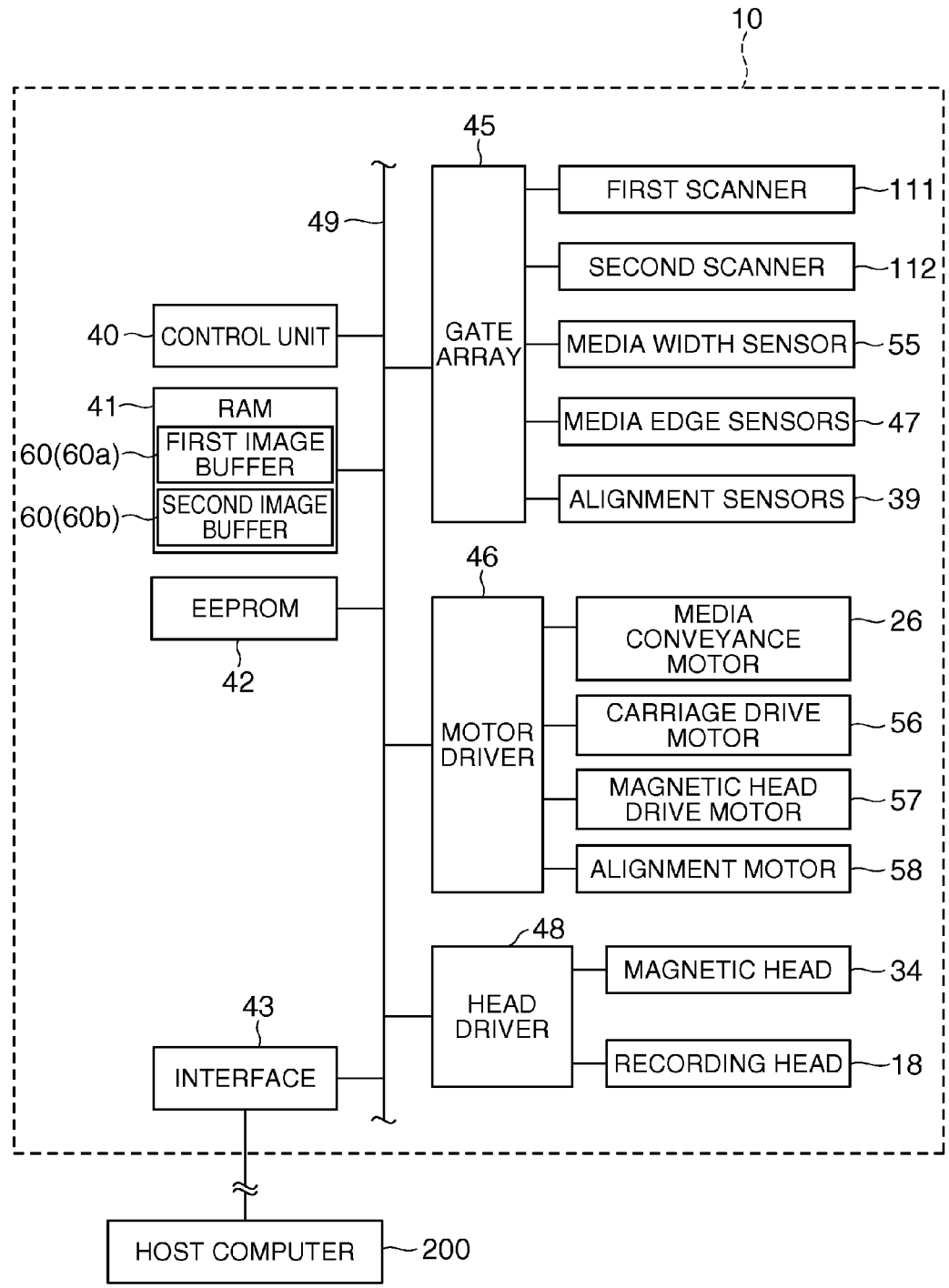
FIG. 4 is a block diagram showing the functional configuration of the dot impact printer.

FIG. 4 is a block diagram showing the control configuration of the dot impact printer 10.

The parts shown in FIG. 4 can be rendered by the cooperation of hardware components disposed to the control circuit board (not shown in the figure) and software.

The dot impact printer 10 has a control unit 40 including a CPU and peripheral circuits that controls the dot impact printer 10 based on a control program, RAM 41 (storage unit)

that temporarily stores data and the control program read from EEPROM 42 by the control unit 40, EEPROM 42 that stores the control program executed by the control unit 40 and processed data, an interface 43 that converts the data format when communicating information with the host computer 200 that controls the dot impact printer 10, a gate array 45 connected to various sensors, a motor driver 46 that drives motors, a head driver 48 that drives heads, and a bus 49 to which these various parts are connected.

An image buffer 60 to which the scanned image data read by the optical reader 110 is written is formed in RAM 41. While described in further detail below, this image buffer 60 is a ring buffer to which data is written cyclically according to a specific sequence. The control unit 40 reads the scanned image data written to the image buffer 60 and outputs to the host computer 200.

The alignment sensors 39, media edge sensors 47, media width sensor 55, first scanner 111 and second scanner 112 are connected to the gate array 45. The gate array 45 quantizes the analog voltages input from the alignment sensors 39, media edge sensors 47, and media width sensor 55, and outputs the resulting digital data to the control unit 40.

The first scanner 111 and second scanner 112 optically read the surface of the recording medium S using a CIS, supply the detection voltages from each pixel of the CIS to the gate array 45, and the gate array 45 quantizes the analog voltages supplied from the first scanner 111 and second scanner 112 and outputs the resulting digital data to the control unit 40. The control unit 40 writes the scanned image data to the image buffer 60 based on the acquired digital data according to a specific process described below.

The motor driver 46 is connected to the media conveyance motor 26, carriage drive motor 56, magnetic head drive motor 57, and alignment motor 58, supplies drive current and drive pulses to the motors, and thus causes the motors to operate. Note also that an alignment motor 58 (FIG. 4) for operating the alignment plate 38 (FIG. 3) may also be connected to the motor driver 46.

The media edge sensors 47 are connected to the recording head 18 and magnetic head 34, and supply drive current to the recording head 18 to drive the recording wires to print. The media edge sensors 47 also output drive current for reading and writing to the magnetic head 34, and when reading magnetic data detect and output the detection voltage (analog voltage) from the magnetic head 34 as digital data to the control unit 40.

The control unit 40 acquires detection signals from the sensors and drives the motors to convey the recording medium S by means of the gate array 45, motor driver 46, and head driver 48 based on a control program stored in EEPROM 42, and drives the heads to record on the recording medium S.

The operation in which scanned image data is written to the image buffer 60 and the scanned image data that was written is sequentially read is described next.

Figure 5:
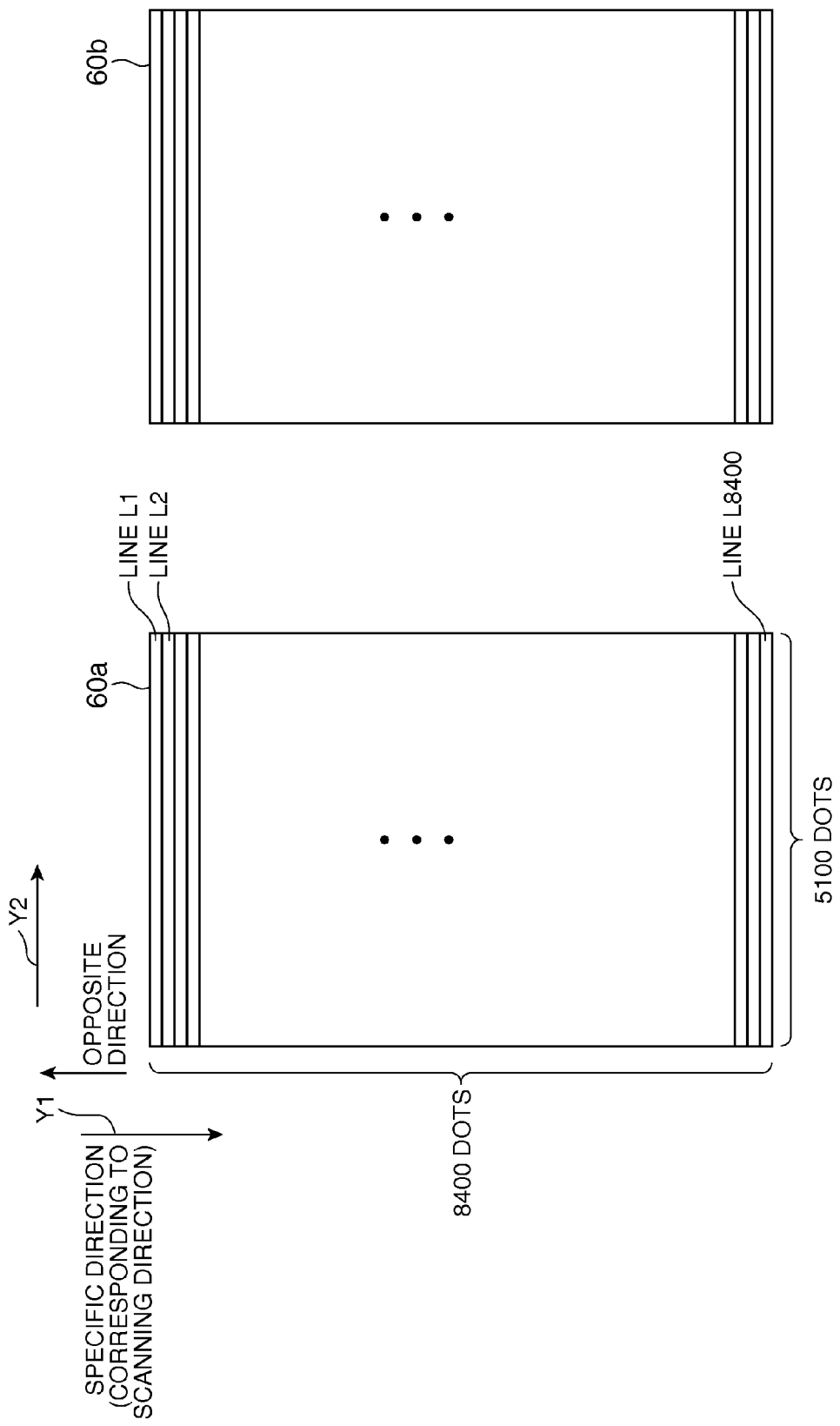
FIG. 5 describes the image buffer.

FIG. 5 schematically describes the state of the image buffer 60 reserved in RAM 41 when scanning a recording medium S, which is a slip of a specific size, at a specific scanning resolution (such as 600 dpi). FIG. 5(A) shows a first image buffer 60a, which is the image buffer 60 to which the scanned image data is written based on the result of scanning by the first scanner 111, and FIG. 5(B) shows a second image buffer 60b, which is the image buffer 60 to which the scanned image data is written based on the result of scanning by the second scanner 112.

As shown in FIG. 5, two buffers are formed in RAM 41 in this embodiment of the invention, the scanned image data captured by the first scanner 111 is written to first image buffer 60a, which is one of the buffers, and the scanned image data captured by the second scanner 112 is written to the second image buffer 60b, which is the other buffer.

Note that the configuration of the image buffer 60 and how the image buffer 60 is used is described below using the first image buffer 60a for example, but the configuration and use of the second image buffer 60b are the same as the first image buffer 60a, and further description thereof is omitted.

The first image buffer 60a is a buffer to which the scanned image data is written.

The scanned image data is bitmap data, and for each pixel of data arranged in a dot matrix of a specific pitch based on the scanning resolution, stores the RGB values of each pixel as gray scale values (gray levels 0-255 for each RGB value, or a bilevel value representing the color component of monochrome images). For brevity below, the information stored for each pixel is referred to simply as a pixel.

In the example shown in FIG. 5(A), the first image buffer 60a can store 8400 pixels in one specific direction (arrow Y1) and 5100 pixels in the line direction (arrow Y2) that is perpendicular to the specific direction. The first image buffer 60a also has plural lines (8400 lines, line L1 to line L8400) that extend in the line direction arrayed in a specific direction. As shown in FIG. 5(A), this specific direction is more specifically the direction from line L1 to line L8400.

The line data (scanned data) is sequentially written line by line in this specific direction to each line of the first image buffer 60a based on the output from the first scanner 111.

More specifically, as described above, the first scanner 111 has a plurality of photosensors arrayed in a line in the main scanning direction (direction C in FIG. 1), and when the surface of the recording medium S is scanned, the surface of the recording medium S is intermittently read in the scanning direction (the opposite direction as the paper feed direction) by the line of photosensors as the recording medium S is conveyed. As each line is read by the line of photosensors, line data for the 5100 pixels (information related to the color of each pixel) on each line in the main scanning direction (direction C) is sequentially generated based on the values output from each of photosensors.

In the first image buffer 60a, the line direction (arrow Y2) is aligned with the main scanning direction (direction C), and the specific direction (arrow Y1) is the direction corresponding to the scanning direction. The data generated as described above is then sequentially written line by line in the specific direction. More specifically, the line data generated from the first scanning results output by the line of photosensors is written to line L1, line data for the next line generated from the output of the line of photosensors is written to line L2, and the line data is thus sequentially written line by line in the specific direction.

The first image buffer 60a is a ring buffer, and line data is written cyclically in a specific direction. More specifically, when line data has been written to line L8400, line data is next written to line L1. In this case line data is already written to line L1, and the previously written data is overwritten by the new line data.

In this embodiment of the invention the control unit 40 manages the lines for writing line data and for reading using a write pointer PW and a read pointer PR.

More specifically, the write pointer PW is a pointer indicating the line for writing the line data. A pointer could be any type of information that holds a value denoting a specific line, and could be a variable defined in a program for managing pointers, or a counter rewritably stored at a specific address in RAM 41, for example. This also applies to the read pointer PR and destructive pointer PH described below.

To write the generated line data to a line in first image buffer 60a, the control unit 40 writes the line data to the line denoted by the write pointer PW, and after finishing writing the line data moves the line denoted by the write pointer PW one line to the specific direction side.

Note that moving the line denoted by the pointer to the specific direction side is referred to below as simply moving the pointer in the specific direction.

In addition, the position of the pointer (or pointer position) as used below is the line denoted by the pointer.

The read pointer PR is a pointer to the line from which the line data is read.

When reading the line data written to the first image buffer 60a, the control unit 40 reads the line data written to the line denoted by the read pointer PR, and when reading the line data from that line ends, moves the line denoted by the read pointer PR one line in the specific direction. Note that the control unit 40 sends the line data that was read according to the specific process described below through the interface 43 to the host computer 200.

The read pointer PR basically moves in conjunction with the write pointer PW. As a result, the line data written to the first image buffer 60a is read and sent to the host computer 200 in the order written.

In this embodiment of the invention line data is read and sent in block units.

Figure 6:
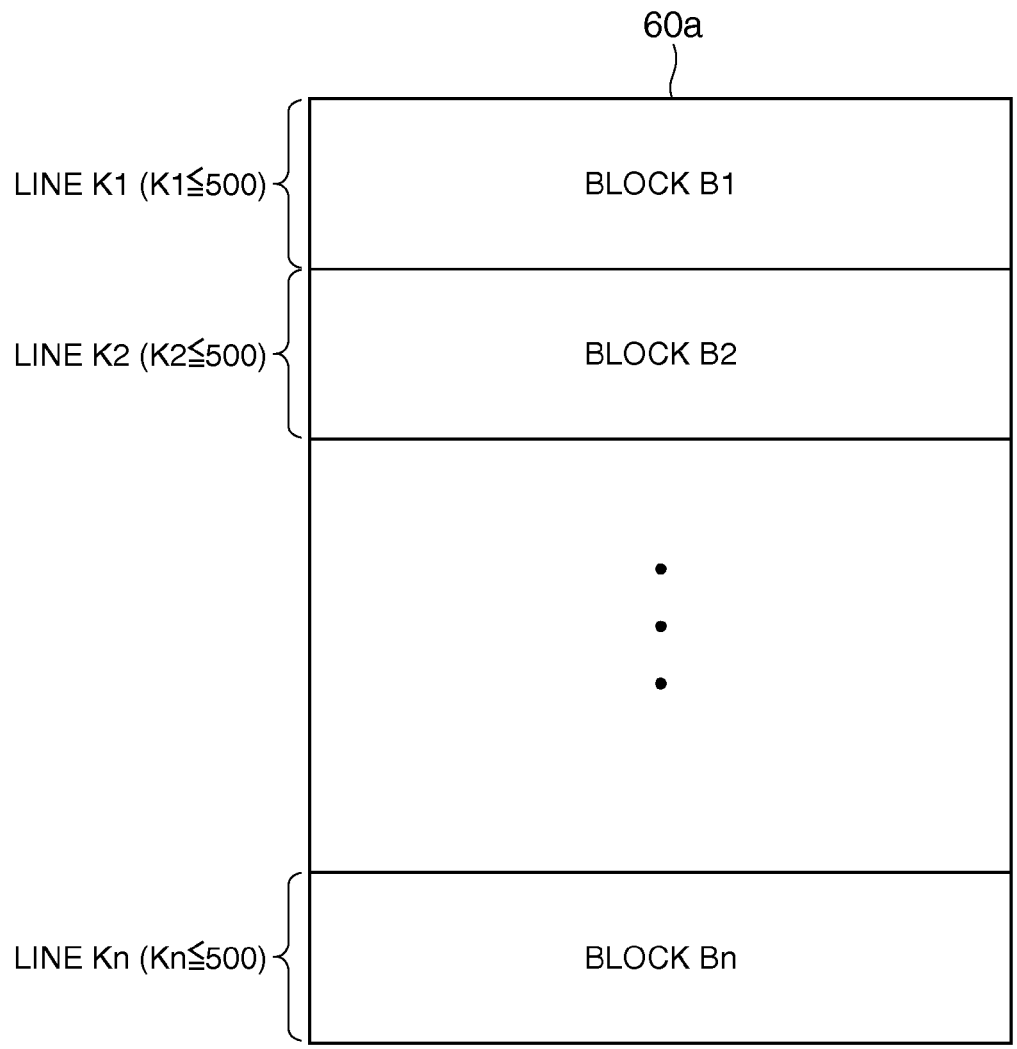
FIG. 6 shows the image buffer to describe blocks.

FIG. 6 describes the blocks, and schematically shows the configuration of the first image buffer 60a divided into blocks.

As shown in FIG. 6, the first image buffer 60a in this embodiment of the invention is divided into groups of plural lines and thus consists of n blocks (block B1 to block Bn). The number of lines in one block is set to a value that is not more than 500 and is suitable for transmitting line data with consideration for the communication speed between the dot impact printer 10 and host computer 200.

In this embodiment line data is transmitted in block units as described above.

More specifically, referring to FIG. 6, when an image on the surface of the recording medium S is scanned by the first scanner 111, line data is sequentially written line by line from line L1 in the specific direction. In this case, line data is not read until writing line data to the K1 number of lines in block B1 to which line L1 belongs is completed, and the read pointer PR therefore continues pointing to line L1.

When writing line data progresses and writing line data to all K1 lines in block B1 is completed, the control unit 40 sequentially reads the line data for each line in block B1 in the specific direction. After reading the line data for all lines in block B1 is completed, the control unit 40 sends all of the read line data to the host computer 200 according to a specific protocol. When reading the line data for all lines in block B1 is completed, the read pointer PR points to the first line in block B2.

After sending the line data for all lines in block B1 is completed, the control unit 40 similarly transmits the line data for block B2. In other words, reading the line data written to the lines in block B2 waits until writing the line data for all lines in block B2 is finished, reading the line data starts after writing the line data for all lines in block B2 is completed, and the read line data is batch transferred to the host computer 200.

The control unit 40 thus transmits line data in block units, can therefore apply a process that reads and transfers data in batches to a group of lines (a block) to which the line data is already written and which is set to a size (number of lines) that is determined with consideration for data transmission, and improves the efficiency of the data reading and transfer process.

The dot impact printer 10 according to this embodiment of the invention is also capable of area scans, a scanning operation that reads and transfers only the line data belonging to a specific area in the first image buffer 60a.

Figure 7:
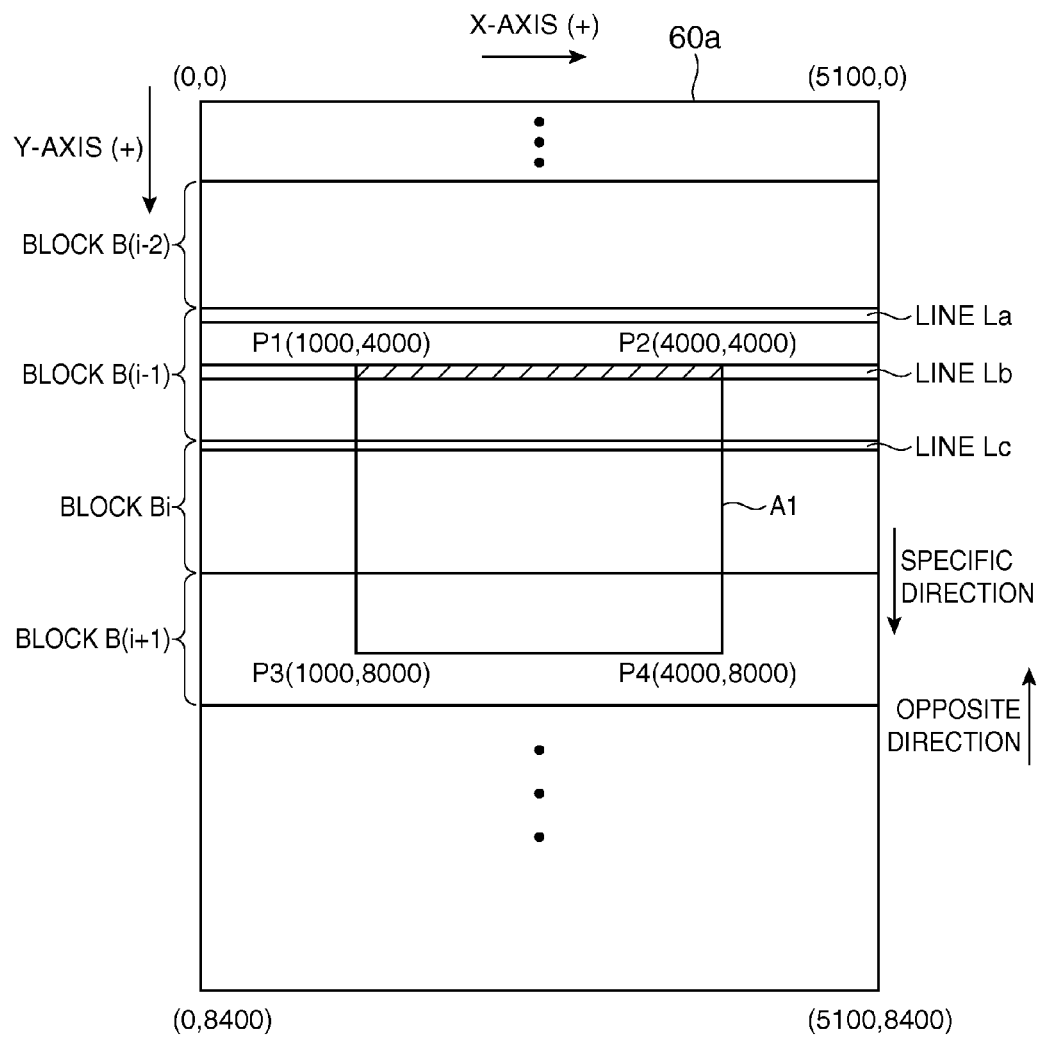
FIG. 7 shows the image buffer to describe an area scan.

FIG. 7 shows the first image buffer 60a to describe an area scan.

In FIG. 7 the first image buffer 60a is converted to a specific coordinate system. Of the pixels (the number of pixels in the scanned image data that is written to first image buffer 60a) in the first image buffer 60a, the pixel at the top left corner of the array is the origin with the coordinates (0,0), and the direction from this origin to the right is positive on the x-axis. The direction down from the origin is positive on the y-axis. The coordinates of the pixel at the top right corner of the array are thus (5100, 0), the coordinates of the pixel at the bottom left corner in the figure are (0, 8400), and the coordinates of the pixel at the bottom right corner in the figure are (5100, 8400). Every pixel in the first image buffer 60a can be uniquely addressed using the coordinates indicating a position relative to this origin.

In the example shown in FIG. 7, an area scan enables reading and sending only the line data contained (belonging) to area A1 defined by the four points P1 (1000, 4000), P2 (4000, 4000), P3 (1000, 8000), and P4 (4000, 8000). In this case, only the image data for the image located in area A1 in the image of the recording medium S is sent to the host computer 200.

Note that to perform an area scan, the user uses a specific user interface (configuration unit) provided by the host computer 200 to define the rectangular portion of the surface of the recording medium S to be scanned and sent. Based on this command, the host computer 200 calculates the coordinates of the four corners of the specified area in the first image buffer 60a, and outputs the calculated coordinates to the control unit 40 of the dot impact printer 10.

The operation of an area scan of area A1 is described next using FIG. 7. Note that as shown in FIG. 7 area A1 includes portions of three blocks, block B(i−1), block Bi, block B(i+1).

Line data is written during an area scan in the same way as when an area scan is not performed, that is, sequentially line by line in the specific direction. Writing the line data in the specific direction proceeds in conjunction with scanning the face of the recording medium S with the first scanner 111 until writing the line data for all lines in block B(i−2), which is the block before block B(i−1), is completed. The write pointer PW points to line La, which is the first line in block B(i−1), in this case.

Because there is no line data to be read when writing block B(i−2) is completed, the control unit 40 does not move the read pointer PR and keeps the read pointer PR pointing to line L1.

After writing line data to block B(i−2) is completed, writing line data advances in the specific direction until writing all line data in block B(i−1) is completed. While area A1 extends into block B(i−1), the control unit 40 does not move the read pointer PR and keeps the read pointer PR pointing to line L1 until writing line data to all lines in block B(i−1) is completed because, as described above, reading and transferring the line data is done in block units.

When writing all line data to block B(i−1) is completed, the control unit 40 moves the read pointer PR in the specific direction to line La. The line data is not read while the read pointer PR is moved. Next, without reading the line data for lines to which line data is written but which are not part of area A1, that is, the lines from line La to line Lb (including line La and not including line Lb), the control unit 40 moves the line pointed to by read pointer PR sequentially in the specific direction until the read pointer PR is set to line Lb. This line Lb contains line data belonging to area A1, and is the line to which the line data located at the opposite end of the block B(i−1) as the end on the specific direction side is written.

Next, the control unit 40 reads the data belonging to area A1 (data in the shaded area in FIG. 7) from the line data written to line Lb. The control unit 40 then moves the read pointer PR one in the specific direction, and reads the data belonging to area A1 from the line data written to the line denoted by the read pointer PR. The control unit 40 thus sequentially reads the data in block B(i−1) belonging to area A1 line by line in the specific direction.

Moving the read pointer PR in the specific direction and reading the data belonging to area A1 proceeds sequentially through block B(i−1), and when the read pointer PR advances to line Lc, which is the first line in block Bi, the control unit 40 sends the data that was read (that is, the data belonging to area A1 in block B(i−1)) to the host computer 200.

The control unit 40 similarly reads and sends the data belonging to area A1 by block unit for block Bi and block B(i+1) in the same way as for block B(i−1). All data belonging to area A1 is thus sent to the host computer 200.

Because the data belonging to area A1 is thus read and output in batches by block unit, the efficiency of the reading and sending process can be improved.

As described above, the first image buffer 60*a* is a ring buffer, and the write pointer PW and the read pointer PR that follows the write pointer PW move from the last line in the first image buffer 60*a* (line L8400 in the example shown in FIG. 5(A)) to the first line (line L1 in the example in FIG. 5(A)).

As the write pointer PW moves in the specific direction in this case, a situation in which the write pointer PW moves past the read pointer PR in the specific direction is possible. This could result in new line data being written to a line from which the line data has not been read, and must therefore be prevented.

Therefore, to prevent this from happening, this embodiment of the invention uses a destructive pointer PH in addition to the write pointer PW and read pointer PR, and the control unit 40 uses the destructive pointer PH to manage the position of the write pointer PW so that the write pointer PW does not move past the read pointer PR in the specific direction.

FIG. 8 shows the configuration of the first image buffer 60*a* to describe the basic operation of the destructive pointer PH.

FIG. 8 shows the write pointer PW, read pointer PR, and destructive pointer PH, and the line pointed to by the tip of each pointer symbol is the line denoted by that pointer.

The following description assumes for simplicity that all scanned image data written to the first image buffer 60*a* is output instead of performing an area scan, and blocks are also not considered.

Figure 8B:
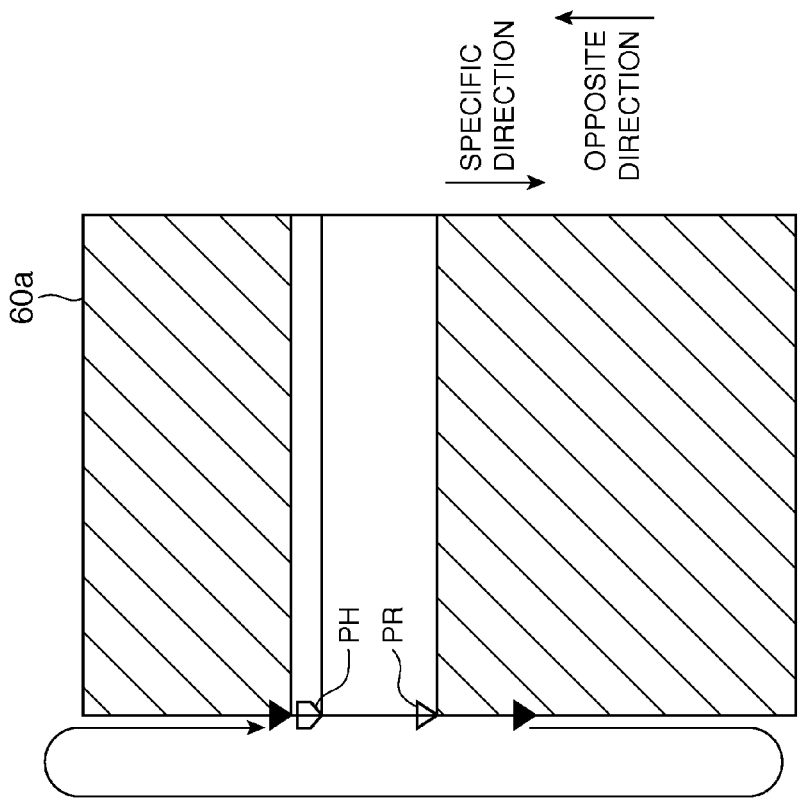
FIG. 8 shows the image buffer to describe a destructive pointer.
Figure 8A:
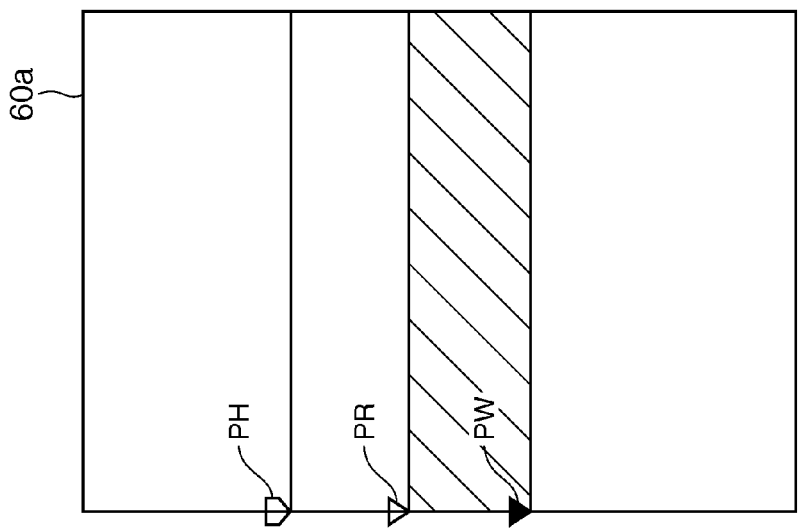

As shown in FIG. 8(A), the destructive pointer PH basically tracks the read pointer PR except as described below. In this embodiment the destructive pointer PH basically tracks the read pointer PR so that the destructive pointer PH always points to a line located 10 lines away in the opposite direction as the specific direction (simply the "opposite direction" below) from the line denoted by the read pointer PR.

In addition, the position of the write pointer PW is controlled so that it does not pass the destructive pointer PH in the specific direction. As a result, the write pointer PW is prevented from surpassing the read pointer PR, and writing new line data to a line to which line data is already written but which has not been read is prevented.

Described more specifically with reference to FIG. 8, the relative positions of the write pointer PW, read pointer PR, and destructive pointer PH are as shown in FIG. 8(A). In FIG. 8(A), the line data written to the lines between the write pointer PW and read pointer PR (the lines contained in the shaded area) is line data that has been completely written but has not been read.

The write pointer PW then moves in the specific direction from the position shown in FIG. 8(A), resulting in a change to the state shown in FIG. 8(B). Because the location of the write pointer PW is controlled so that the write pointer PW does not move past the destructive pointer PH in the specific direction, the write pointer PW can be reliably prevented from reaching an area (the shaded area in FIG. 8(B)) where there are lines where line data writing is completed but the line data has not been read.

Reading and outputting only data belonging to plural different areas in the first image buffer 60*a* is possible in the area scan described above. There could also be portions of these plural different areas that overlap in the line direction. Data belonging to the plural different areas is read as described below in this case.

Figure 9:
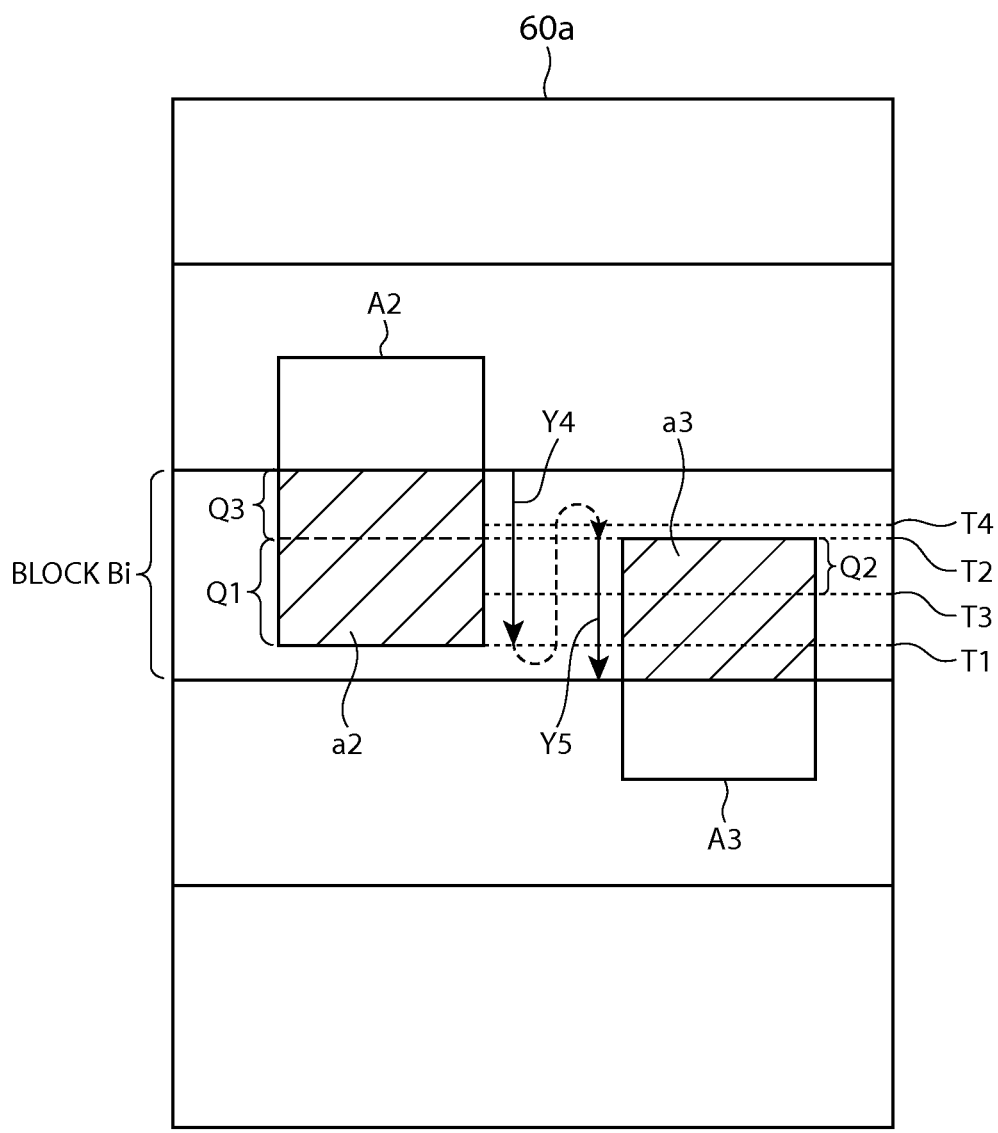
FIG. 9 describes the image buffer during an area scan.

FIG. 9 shows the first image buffer 60*a* to describe the process of reading data from different areas that overlap in the line direction.

In the example in FIG. 9 an area scan is performed for area A2 and area A3. More specifically, only data for area A2 and area A3 is read and output. As shown in FIG. 9, area A2 and area A3 have parts that overlap in the line direction in range Q1.

In this scenario area a2, which is the part of area A2 in block Bi, and area a3, which is the part of area A3 in block Bi, are read separately.

Note that in the following description the control unit 40 has previously detected the ranges of areas a2 and a3 in block Bi based on information related to block Bi and the coordinates of the vertices of area A2 and area A3 input from the host computer 200, and manages moving the read pointer PR based on these detected ranges.

Assuming that writing line data to all lines in block Bi is completed, the control unit 40 first reads the data belonging to area a2 using the method described above sequentially line by line in the specific direction. The read pointer PR moves as denoted by arrow Y4 in this case and eventually reaches position T1. When reading the data in area a2 is completed, the control unit 40 sends the read data to the host computer 200. This embodiment thus reads and sends data by area unit when there are plural different areas in the same block. As a result, data belonging to different areas is read and sent in batches by area, thus simplifying the data reading and transmission process, and improving the efficiency of the process.

When reading the data in area a2 is completed, the control unit 40 moves the read pointer PR to position T2 at the beginning of area a3. The control unit 40 then reads the data in area a3 sequentially line by line in the specific direction. In this case the read pointer PR moves as indicated by arrow Y5. The control unit 40 then outputs the data belonging to the read area a3 to the host computer 200.

The control unit 40 can thus separately read and output to the host computer 200 data belonging to area a2 and data belonging to area a3.

Because the destructive pointer PH always points to a line separated 10 lines in the opposite direction from the line indicated by the read pointer PR, the following problem can occur when the destructive pointer PH is moved during an area scan that scans plural different areas having parts that overlap in the line direction as shown in FIG. 9.

More specifically, when reading the data in area a2 is completed and the read pointer PR has moved to position T1, the destructive pointer PH moves to position T3, which is a position 10 lines in the opposite direction from position T1.

In this case, there are lines in range Q2 between position T2 and position T3 containing data that is to be read but has not been completely read (the data in area a3). New line data should therefore not be written to the lines in range Q2 until reading the data belonging to area a3 is completed. However, because the destructive pointer PH is at position T3, the write pointer PW, movement of which is controlled so that the write pointer PW does not pass the destructive pointer PH in the specific direction, reaches the position of the destructive pointer PH, and new line data can be written to the lines in range Q2 that have not been read completely.

To prevent this, the control unit 40 controls the position of the destructive pointer PH as described below.

When the control unit 40 moves the destructive pointer PH one line in the specific direction, the control unit 40 first determines if the line data written to the line to which the destructive pointer PH is to move includes data that should be read but for which reading is not completed. If such data is not included, the control unit 40 moves the destructive pointer PH one line. If such data is included, the destructive pointer PH does not move. The control unit 40 then monitors the completion of reading all data that should be read but for which reading is not completed on the line to which the destructive pointer PH is to be moved, and when reading all such data is completed and the distance in the specific direction between the destructive pointer PH and the read pointer PR exceeds 10 lines, moves the destructive pointer PH one line in the specific direction.

In the example in FIG. 9, the destructive pointer PH is already set to position T4 one line in the opposite direction from position T2. In addition, reading data for area a2 is completed, but none of the data in area a3 has been read. The control unit 40 then attempts to move the destructive pointer PH from position T4 to position T2 in conjunction with moving the read pointer PR in the specific direction.

Before moving the destructive pointer PH to position T2 in this case, the control unit 40 determines if the line data written to the line corresponding to position T2 contains data that should be read but for which reading is not completed. This decision can be made based on stored information indicating the state of data reading, or based on the state of a flag that is used to manage line by line whether or not the line data contains data that should be read but for which reading is not completed.

Because the line data written to the line at position T2 contains data that should be read but for which reading is not completed (the data in area a3), the control unit 40 stops moving the destructive pointer PH to position T2.

Next, the control unit 40 monitors whether or not reading the data in area a3 that is contained in the line data written to the line corresponding to position T2 is completed. In other words, the control unit 40 monitors when all of the line data written to the line corresponding to position T2 that should be read is completed. If reading the data in area a3 is completed and the distance in the specific direction between the destructive pointer PH and read pointer PR is more than 10 lines, the control unit 40 moves the destructive pointer PH from position T4 to position T3.

When the line data written to a particular line contains data that should be read but for which reading is not completed, the control unit 40 in this embodiment of the invention controls moving the destructive pointer PH so that the destructive pointer PH does not move in the specific direction past that one line regardless of the position of the read pointer PR.

As a result, writing new line data to a line containing data that should be read but for which reading is not completed can be desirably prevented.

In addition, if moving the destructive pointer PH is controlled as described above and there are plural different areas within a block, the destructive pointer PH can be moved appropriately in the specific direction in ranges where these areas do not overlap in the line direction (such as range Q3 in FIG. 9) according to the read status of data that must be read from the line data in this range. Unnecessary movement of the destructive pointer PH in the specific direction is thus limited. In conjunction therewith, unnecessarily restricting the area to which new line data can be written is also prevented. This is described more specifically using FIG. 9. If reading data from area a2 in range Q3 is completed, reading the data that should be read from the line data written to the lines contained in range Q3 is completed. The destructive pointer PH can be moved in the specific direction, and by controlling moving the destructive pointer PH as described above, the destructive pointer PH moves appropriately in the specific direction in conjunction with reading data from area a2 in range Q3.

The area scan described above also enables reading data belonging to areas that are separated from each other in the specific direction.

FIG. 10 shows the first image buffer 60*a* to describe reading data from areas that are separated in the specific direction.

Referring to FIG. 10(A), the reading process of the related art not using the invention is described first.

In the example in FIG. 10(A), an area scan is performed to read area A4 and area A5, which is separated from area A4 in the specific direction.

As shown in FIG. 10(A), area A4 is associated with block B1, the first of the plural blocks formed in the first image buffer 60*a*, and area A5 is associated with block Bn, the last of the plural blocks formed in the first image buffer 60*a*.

When area A4 and area A5 are defined as described above and writing line data to all lines in block B1 is completed as the first scanner 111 scans the face of the recording medium S, the control unit 40 reads and outputs the data belonging to area A4 as described above using the method of the related art. When reading and sending the data in area A4 of block B1 is completed, the read pointer PR is set to position T6, the position of the first line in block B2.

Writing line data continues even after writing line data to all lines in block B1 is completed until writing line data to all lines in block B2 to block B(n−1) is finished. Because there is no data to be read in block B2 to block B(n−1), the control unit 40 holds the read pointer PR as set when reading and sending the data in area A4 of block B1 was completed, that is, set to the position T6 corresponding to the first line in block B2.

Writing line data in the specific direction then continues until writing line data to all lines in block Bn is finished. Triggered by finishing writing line data to block Bn, that is, the block containing area A5, the control unit 40 starts moving the read pointer PR in the specific direction. Because there is no data to be read from the lines in block B2 to block B(n−1), the read pointer PR moves in the specific direction without actually reading data.

After moving the read pointer PR to the first line in block Bn, the control unit 40 reads and sends the data from area A5 in block Bn.

When different areas that are separated in the specific direction are read using this method of the related art, problems such as described below can occur.

That is, because writing line data to block Bn triggers starting to move the read pointer PR in the specific direction from position T6, the distance in the specific direction between the destructive pointer PH that tracks the read pointer PR and the write pointer PW (the distance denoted by D1 in FIG. 10(A)) may become too short. As a result, movement of the write pointer PW is limited by the destructive pointer PH, and writing new line data to the first image buffer 60a may not be possible when new line data to be written has been generated.

To prevent this problem, the control unit 40 controls the position of the read pointer PR as described below in this embodiment of the invention.

More specifically, the control unit 40 constantly monitors the number of lines between the write pointer PW and read pointer PR.

If the number of lines between the write pointer PW and read pointer PR exceeds a predetermined line count, the control unit 40 determines if there is any data to be read in the area between the write pointer PW and the read pointer PR. If there is no data to be read, the control unit 40 performs a dummy reading process that moves the read pointer PR in the specific direction without reading the line data from the lines in the area between the write pointer PW and read pointer PR.

This is described more specifically using FIG. 10(B). When reading and sending the data from area A4 in block B1 is completed and the read pointer PR is set to position T6, the control unit 40 monitors the number of lines between the write pointer PW and read pointer PR. When the number of lines between the write pointer PW and read pointer PR exceeds a number defined as the threshold value, such as 1000, as shown in FIG. 10(B), the control unit 40 determines if there is data to be read in range Q4 between the write pointer PW and read pointer PR. If there is no data to read in range Q4, the control unit 40 moves the read pointer PR in the specific direction the number of lines in range Q4, and performs a dummy reading process that does not actually read the line data.

By thus performing a dummy reading process in range Q4, the read pointer PR moves to position T7, and the destructive pointer PH, which follows movement of the read pointer PR, moves in the specific direction before writing line data to all lines in block Bn is completed. Note that the dummy reading process is executed and the read pointer PR and destructive pointer PH are moved in the specific direction even after the read pointer PR moves to position T7 if the number of lines between the write pointer PW and read pointer PR exceeds the threshold value and there is no data to be read in the range between these pointers.

As described above, if the number of lines between the write pointer PW and read pointer PR exceeds the threshold value and there is no data to be read in the range between these pointers, a dummy reading process is executed as needed and the read pointer PR and destructive pointer PH are moved in the specific direction in this embodiment. Because the destructive pointer PH is a pointer that functions as a stop limiting movement of the write pointer PW, moving the destructive pointer PH in the specific direction in conjunction with the dummy reading process expands the area to which new line data can be written in the first image buffer 60a compared with the related art, and the risk of being unable to write new line data to the first image buffer 60a can be reduced. The chance of the write pointer PW and destructive pointer PH becoming too close together is also reduced during an area scan of different areas that are separated in the specific direction, and being unable to write the new line data to the first image buffer 60a when new line data to be written is generated can be prevented as much as possible.

Note that the number of lines set as the threshold between the write pointer PW and read pointer PR is 1000 in this embodiment, but this threshold value is set as described below.

More specifically, the number of lines in one block is not more than 500 in this embodiment as described above. The threshold value is set to the number of lines (1000 lines) in two blocks containing the maximum number of lines each (500 lines). This assures that when the write pointer PW and read pointer PR are separated two blocks of the maximum line count (500 lines), the write pointer PW and read pointer PR are separated a sufficient distance from each other relative to the total number of lines (8400 lines) in the first image buffer 60a.

As described above, the control unit 40 in this embodiment controls moving the destructive pointer PH in the specific direction so that it not pass the position of a line containing line data that has not been completely read regardless of the position of the read pointer PR.

As a result, movement of the destructive pointer PH is controlled in the specific direction so that it not pass the position of a line containing line data that has not been completely read regardless of the position of the read pointer PR. Because moving the write pointer PW is controlled so that the write pointer PW is not set to a position past the destructive pointer PH in the specific direction, writing new line data to a line to which line data containing data that has not been completely read is written can be effectively prevented.

The control unit 40 in this embodiment can read data in an area scan so that data belonging to plural different areas of the first image buffer 60a, which is a ring buffer, can be read area by area. When data belonging to plural different areas is contained in the line data for one line, the control unit 40 prevents the destructive pointer PH from moving to a position in the specific direction past the position of the line to which the line data of the one line is written regardless of the position of the read pointer PR until reading all data in each area is completed.

As a result, when reading data belonging to plural different areas of the first image buffer 60a, which is a ring buffer, in an area scan, writing new line data to the line to which the line data of the one line is written before reading all of the included data is completed can be effectively prevented even when data belonging to plural different areas is contained in the line data for one line.

In this embodiment, when the first image buffer 60a, which is a ring buffer, is divided in increments of plural lines into blocks, and writing line data to each line in one block is completed, the control unit 40 moves the read pointer PR in the specific direction inside the block, and reads the line data from the lines in that block in the specific direction. When there are plural areas in one block, moving the destructive pointer PH is controlled regardless of the position of the read pointer PR so that the destructive pointer PH does not move in the specific direction past the position of a line in that block to which line data containing data that has not been completely read is written.

As a result, a read process that reads line data in block units can be performed efficiently, and when there is line data that includes data that has not been completely read in a block, moving the destructive pointer PH is controlled so that the destructive pointer PH does not pass the line to which the line data is written in the specific direction, and writing new line data to that line can be effectively prevented.

In this embodiment, when the first image buffer 60a, which is a ring buffer, is divided in increments of plural lines into blocks, and writing line data to each line in one block is completed, the control unit 40 moves the read pointer PR to the position denoting the line to be read in the one block, and while moving the read pointer PR in the specific direction in the one block, reads the line data for the lines in that block in the specific direction. For lines that are between the write pointer PW and the read pointer PR and contain line data that does not require reading, a dummy reading process is performed to move the read pointer PR in the specific direction without reading the line data written to the intervening lines.

As a result, a dummy reading process is performed to move the read pointer PR in the specific direction without reading the line data written to lines that are between the write pointer PW and the read pointer PR and contain line data that does not require reading. The read pointer PR can therefore be moved in the specific direction before writing line data to all lines in the block is completed. As a result, more regions that have been completely read and to which new line data can be written can be assured in the first image buffer 60a.

In this embodiment of the invention, when the write pointer PW and read pointer PR are separated more than a threshold value in the specific direction, and the line data written to the lines between these pointers is data that does not require reading, the control unit 40 applies a dummy reading process to the lines between the pointers.

As a result, because a dummy reading process is applied to the lines between the pointers when the write pointer PW and read pointer PR are separated more than a threshold value in the specific direction and the line data written to the lines between these pointers is data that does not require reading, the dummy reading process is appropriately applied when needed.

In this embodiment the control unit 40 can read line data belonging to plural different areas in the first image buffer 60a area by area. When one area and another area in the first image buffer 60a are separated in the specific direction, and there are lines containing line data that does not require reading between one block associated with the one area and another block associated with the other area, the control unit 40 applies a dummy reading process to these lines.

As a result, a dummy reading process is applied to lines between one block associated with the one area and another block associated with another area when there is no data that requires reading. The read pointer PR can therefore move in the specific direction before writing line data to all lines in the block containing the other area is completed. More areas in which reading is completed, or in other words, more areas to which new line data can be written, can therefore be assured in the first image buffer 60a.

The control unit 40 in this embodiment of the invention also controls moving the write pointer PW according to the destructive pointer PH that tracks the read pointer PR so that the write pointer PW does not move past the destructive pointer PH in the specific direction.

The dummy reading process thus causes the destructive pointer PH that tracks the read pointer PR to move in the specific direction in conjunction with the read pointer PR moving in the specific direction, and can thus assure more areas to which new line data can be written.

The invention is described above with reference to a preferred embodiment of the invention thereof, but the invention is not so limited.

A control unit 40 mounted on a control circuit board (not shown in the figure) installed in a dot impact printer 10 manages the pointers in the embodiment described above, but a configuration in which a device externally connected to the dot impact printer 10 manages the pointers is also conceivable. More specifically, the function blocks shown in FIG. 4 are achieved by the cooperation of hardware and software components, the specific hardware configuration and the software specifications can be determined as desired, and other details of the configuration described above can be changed as desired.

The foregoing embodiment also describes applying the invention to a flatbed device that conveys the recording medium S laying flat, but the invention is not so limited. For example, the invention can obviously be applied to devices having a conveyance path that conveys checks, slips, and similar recording media S standing on edge. A dot impact printer 10 having an optical reader 110 is also used as an example in the foregoing embodiment, but the invention is not so limited. For example, the invention can also be applied to other devices having an optical reading unit equivalent to the optical reader 110, including inkjet printers, thermal printers, and laser printers. The invention is also not limited to devices used as stand-alone printers, and configurations having an optical reading unit equivalent to the optical reader 110 incorporated into another device, such as an ATM (automated teller machine) or CD (cash dispenser) terminal, are also conceivable.

The invention is also not limited to configurations having a optical reader 110 incorporated in unison with a device that records text or images to paper or other recording media, and can be applied to a wide range of devices including separate scanners and photocopiers.

More specifically, the invention can be broadly applied to optical reading devices capable of optically reading media.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

The entire disclosure of Japanese Patent Application No: 2011-51964, filed Mar. 9, 2011 is expressly incorporated by reference herein.

TEXT IN THE FIGURES

FIG. 4

CONTROL UNIT 40
RAM 41
FIRST IMAGE BUFFER 60a
SECOND IMAGE BUFFER 60b
EEPROM 42
INTERFACE 43
GATE ARRAY 45
MOTOR DRIVER 46
HEAD DRIVER 48
FIRST SCANNER 111
SECOND SCANNER 112
MEDIA WIDTH SENSOR 55
MEDIA EDGE SENSORS 47
ALIGNMENT SENSORS 39
MEDIA CONVEYANCE MOTOR 26
CARRIAGE DRIVE MOTOR 56
MAGNETIC HEAD DRIVE MOTOR 57
ALIGNMENT MOTOR 58
MAGNETIC HEAD 34

RECORDING HEAD 18
HOST COMPUTER 200

FIG. 5

OPPOSITE DIRECTION
SPECIFIC DIRECTION (CORRESPONDING TO SCANNING DIRECTION)
8400 DOTS
5100 DOTS

FIG. 6

LINE K1 (K1≤500)
BLOCK B1

FIG. 7

X-AXIS (+)
Y-AXIS (+)
BLOCK B(i−2)
LINE La
SPECIFIC DIRECTION
OPPOSITE DIRECTION

FIG. 8

SPECIFIC DIRECTION
OPPOSITE DIRECTION
WRITE POINTER PW
READ POINTER PR
DESTRUCTIVE POINTER PH

FIG. 9

BLOCK Bi

FIG. 10

DISTANCE D1
BLOCK B1
LINE 1000

What is claimed is:

1. An optical reading device comprising:
an optical reading unit having optical elements disposed in a line that reads a medium;
a storage unit having a ring buffer formed in the storage space; and
a control unit that writes scanned data read by the optical reading unit to the ring buffer, reads the scanned data written to the ring buffer, transfers the scanned data that was read, and
manages positions in the ring buffer for writing and reading the scanned data using a write pointer denoting the position for writing the scanned data to the ring buffer, and a read pointer denoting the position of scanned data that has not been read;
a configuration unit that defines a specific area on the medium;
wherein the control unit reads scanned data in a defined area defined by the configuration unit, and when the scanned data between the position of the read pointer and the position of the write pointer in the ring buffer writing direction is not the scanned data from the defined area, executes a dummy reading process that advances the position of the read pointer without reading the scanned data;
the control unit uses a destructive pointer denoting the position in the ring buffer of scanned data that can be deleted or overwritten and, so that the destructive pointer does not surpass the position of the write pointer, controls the write pointer and controls the destructive pointer so that the destructive pointer does not surpass the position of scanned data that has not been completely read regardless of the position of the read pointer.

2. The optical reading device described in claim 1, wherein:
the scanned data that the control unit writes to the ring buffer is line data; and
reading the scanned data is performed in blocks each containing a plurality of line data.

3. The optical reading device described in claim 2, wherein:
after writing the line data to one block is completed, the control unit moves the read pointer to the position of line data to be read from the one block, and reads the line data in the one block while moving the position of the read pointer in the one block.

4. The optical reading device described in claim 2, wherein:
the configuration unit can set a first area and a second area that is different from the first area; and
when the configuration unit sets the first area and the second area, the control unit reads the second area after reading the first area.

5. The optical reading device described in claim 1, wherein:
when the position of the write pointer and the position of the read pointer are separated a predetermined amount or more, the control unit determines if there is scanned data to be read between the position of the read pointer and the position of the write pointer in the write direction of the control unit, and when there is no scanned data to read, executes a dummy reading process that advances the position of the read pointer.

6. A method of controlling an optical reading device, comprising steps of:
reading a medium by an optical reading unit having optical elements disposed in a line;
writing scanned data that was read to a ring buffer and moving a write pointer denoting the position where the scanned data was written;
reading the scanned data written to the ring buffer;
when the scanned data has been read, moving a read pointer denoting the position where the scanned data was read to the position where the scanned data was read;
setting a specific area on the medium; and
when the scanned data written between the position of the read pointer and the position of the write pointer in the ring buffer writing direction is not scanned data from the defined area, moves the read pointer without reading the scanned data; and
using a destructive pointer denoting the position in the ring buffer of scanned data that can be deleted or overwritten and, so that the destructive pointer does not surpass the position of the write pointer, controlling the write pointer and controlling the destructive pointer so that the destructive pointer does not surpass the position of scanned data that has not been completely read regardless of the position of the read pointer.

7. The method of controlling an optical reading device described in claim 6, wherein:
the scanned data written to the ring buffer is line data; and reading the scanned data from the ring buffer is performed in block units each containing a plurality of line data units.

8. The method of controlling an optical reading device described in claim 6, wherein:

the scanned data read from the ring buffer batch transfers the scanned data contained in the defined area to a host device.

\* \* \* \* \*